H. G. PURINTON.
MILKING PAIL AND COVER THEREFOR.
APPLICATION FILED JULY 26, 1915.
1,181,164.
Patented May 2, 1916.
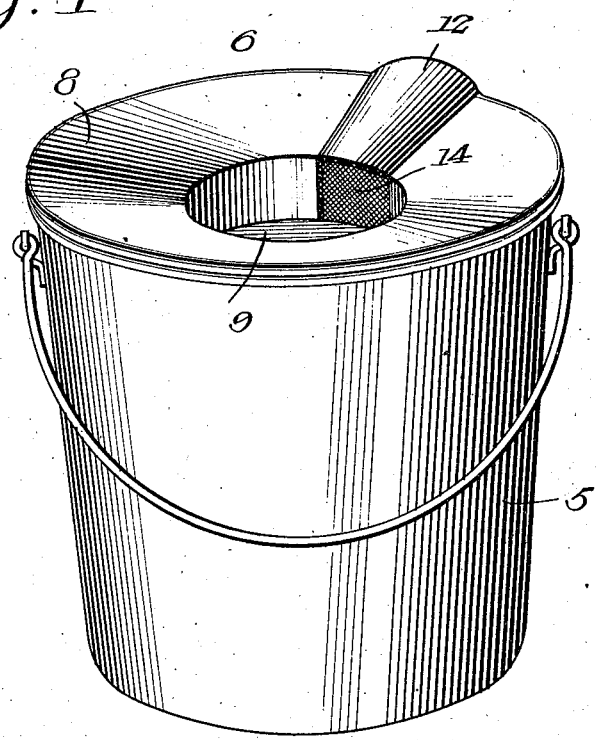
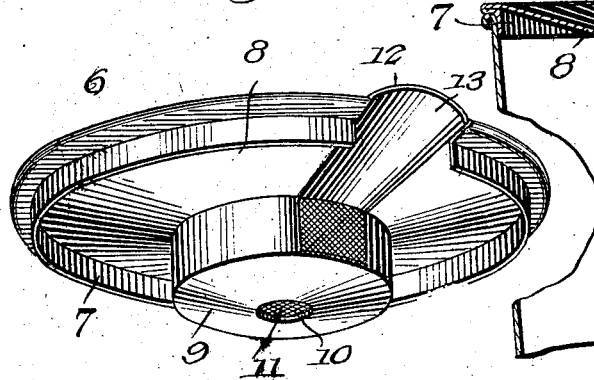
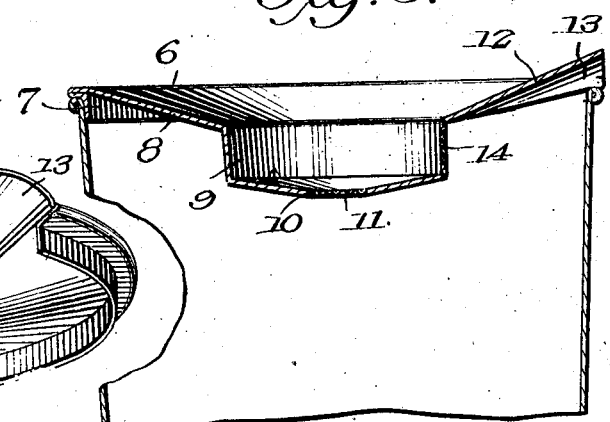
Inventor
H. G. Purinton
By Victor J. Evans
Attorney
Witnesses

UNITED STATES PATENT OFFICE.

HARLOW G. PURINTON, OF PHILADELPHIA, PENNSYLVANIA.

MILKING-PAIL AND COVER THEREFOR.

1,181,164. Specification of Letters Patent. Patented May 2, 1916.

Application filed July 26, 1915. Serial No. 41,965.

*To all whom it may concern:*

Be it known that I, HARLOW G. PURINTON, a citizen of the United States, residing at Roxborough, Philadelphia, in the county of Philadelphia and State of Pennsylvania, have invented new and useful Improvements in Milking-Pails and Covers Therefor, of which the following is a specification.

The invention relates to a milking receptacle, and more particularly to the class of milking pails and covers therefor, the same being an improvement in the construction forming the subject matter of Letters Patent No. 1,126,564, issued to me on or about the 26th day of January, 1915.

The primary object of the invention is the provision of a milking pail and cover therefor in which the cover is of novel construction so as to assure the contents of the pail sanitary and to avoid the entrance of dust, dirt and other foreign matter therein during the milking operation.

Another object of the invention is the provision of a pail and cover therefor wherein the contents of the pail can be dispensed without the removal of the cover, and while in the act of milking the milk will freely enter the pail free from insects, dirt, dust, or other foreign matter.

A still further object of the invention is the provision of a pail and cover therefor which are simple in construction, thoroughly reliable and efficient in their purpose, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a perspective view of a pail and cover therefor constructed in accordance with the invention. Fig. 2 is a perspective view looking toward the bottom of the cover. Fig. 3 is a vertical longitudinal sectional view.

Similar reference characters indicate corresponding parts throughout the several views in the drawing.

Referring to the drawing in detail, 5 designates a pail body which can be of any desirable shape, and has fitted thereon a cover body 6 formed to provide an annular depending flange 7 adjacent its periphery and telescoped within the mouth of the pail when the cover is arranged in position thereon. The cover body 6 is depressed to provide a funnel 8 having a central cup 9 which is struck inwardly therefrom and is provided with a central hole or opening 10 containing a foraminous or reticulated strainer 11 which is suitably mounted in the said hole or opening.

Formed in the cover body 6 between its peripheral edge and the opening or hole 10 is an upwardly bulged portion 12 providing a pouring spout 13, the flange 7 being cut away at the point of the spout so as to not interfere with the pouring of the contents of the pail body on the tilting thereof. At the inner end of the spout 13 and formed in the side of the cup or well 9 is a foraminous or reticulated strainer 14 which permits the free entrance of the milk during the milking operation in to the pail body without possibility of the entrance of dust, dirt, foreign matter or insects therein, thereby assuring the contents thoroughly sanitary.

From the foregoing description it will be seen that the cover normally fits tight upon the pail; that the cover is held in place while the pail is used in the milking operation; that the milk will be strained when entering the pail, and that the milk can be readily poured from the said pail without removing the cover.

What is claimed is:

The combination with a pail, a cover body depressed to form a funnel and having a cup-shaped center provided with a reticulated opening in its bottom and side, and an upwardly bulged portion struck from the depressed portion of the cover body between the periphery and the cup to form a pouring spout.

In testimony whereof I affix my signature in presence of two witnesses.

HARLOW G. PURINTON.

Witnesses:
JOHN J. FORAN,
FRANCES C. DOUGHERTY.

Copies of this patent may be obtained for five cents each, by addressing the "Commissioner of Patents, Washington, D. C."